(12) United States Patent
Amafuji et al.

(10) Patent No.: US 6,359,602 B1
(45) Date of Patent: Mar. 19, 2002

(54) HEAD-MOUNTED DISPLAY DEVICE

(75) Inventors: Hisashi Amafuji; Ryutaro Nasu; Tetsuo Mayama; Keizou Kumai, all of Kyoto; Hiroyuki Hatanaka, Muko, all of (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/262,359

(22) Filed: Mar. 4, 1999

(30) Foreign Application Priority Data

| Mar. 9, 1998 | (JP) | ............................................ | 10-076703 |
| Aug. 25, 1998 | (JP) | ............................................ | 10-256060 |
| Oct. 9, 1998 | (JP) | ............................................ | 10-303409 |

(51) Int. Cl.$^7$ ................................................ G09G 5/00
(52) U.S. Cl. ............................................... 345/8; 42/48
(58) Field of Search ............................ 345/8, 9, 42, 48; 359/482, 67, 631

(56) References Cited

U.S. PATENT DOCUMENTS

| 3,923,370 A | * | 12/1975 | Mostrom | ..................... 359/630 |
| 4,231,117 A | * | 11/1980 | Aileo | ............................. 345/8 |
| 4,468,101 A | * | 8/1984 | Ellis | ........................... 313/524 |
| 4,551,861 A | * | 11/1985 | Marchello | ..................... 2/425 |
| 5,003,300 A | * | 3/1991 | Wells | ............................. 345/8 |
| 5,095,552 A | * | 3/1992 | Parkinson | ...................... 345/8 |
| 5,266,930 A | * | 11/1993 | Ichikawa et al. | ............... 345/8 |
| 5,276,471 A | * | 1/1994 | Yamauchi et al. | .............. 345/8 |
| 5,345,281 A | * | 9/1994 | Taboada et al. | ............. 351/210 |
| 5,619,373 A | * | 4/1997 | Meyerhorfer et al. | ........ 359/482 |
| 5,703,605 A | * | 12/1997 | Takahashi et al. | ............. 349/67 |
| 5,835,277 A | * | 11/1998 | Hegg | .......................... 359/630 |
| 5,859,624 A | * | 1/1999 | Matsumoto et al. | ........... 345/8 |
| 5,880,888 A | * | 3/1999 | Schoenmakers | ............. 359/631 |

FOREIGN PATENT DOCUMENTS

| EP | 0 344 881 | 12/1989 |
| GB | 2 238 627 | 6/1991 |
| WO | 95/11473 | 4/1995 |

* cited by examiner

*Primary Examiner*—Chanh Nguyen
*Assistant Examiner*—Fritz Alphonse
(74) *Attorney, Agent, or Firm*—Rader, Fishman & Grauer, PLLC

(57) ABSTRACT

In a head-mounted display device, image display light emitted from a display device is directed towards the eye of an observer by changing the light path thereof by means of an optical system. The display device, optical system and a drive signal generating device for the display device are worn on the head of the observer by means of a holding member. This optical system is positioned in front of the display device emitting display light in a forward direction from a position separated radially from the visual axis of the observer when looking straight ahead. The drive signal generating device is located in a position separated radially from the visual axis with an interval from the display device and optical system.

11 Claims, 16 Drawing Sheets

HEAD-MOUNTED DISPLAY DEVICE

TECHNICAL FIELD

The present invention relates to a head-mounted display device whereby an image display section can be worn on the head of an observer.

DESCRIPTION OF RELATED ART

A head-mounted display device enables various information to be displayed in a simple manner, by means of a small, lightweight display device worn on the head of an observer.

Conventionally, the display device and a device for generating drive signals for the display device are combined directly. Furthermore, the display device and an optical system, which changes the light path in order to direct display light emitted from the display device towards the observer's eye, are also combined directly. In other words, the display device, optical system and drive signal generating device are located in a concentrated fashion in front of the observer's eye. For this reason, there have been problems in that the weight of the device has an unbalancing effect on the observer, thereby reducing the wearing comfort.

Consequently, it has been thought that the weight balance of the device can be improved by coupling the display device and optical system directly and positioning the driving circuit beside the side of the observer's head. However, if the display device and optical system are coupled together directly in front of the observer's eyes, then a problem arises in that the observer's field of vision is restricted by the display device.

It is an object of the present invention to provide a head-mounted display device which is capable of resolving the foregoing problems.

SUMMARY OF THE INVENTION

The present invention is a head-mounted display device, wherein a display device for emitting image display light, an optical system for changing the light path of the display light in order to direct the light towards the eye of an observer, and a drive signal generating device for the display device, are worn on the head of the observer, characterized in that the display device is located in such a manner that the display light is emitted in a forward direction from a position separated radially from the visual axis of the observer when looking straight ahead; the optical system is located in front of the display device with an interval; and the drive signal generating device is located in a position that is separated radially from the visual axis and separated with an interval from the display device and optical system.

According to the constitution of the present invention, the image display light emitted from the display device travels in a forward direction from a position separated radially from the visual axis of the observer when looking straight ahead, whereupon the light path of the display light is changed by the optical system and directed towards the eye of the observer. Thereby, an image is seen by the observer.

Since the display device, optical system and drive signal generating device are mutually separated by intervals, it is possible to prevent the weight of the device from having an unbalancing action on the observer. Moreover, since the display device and drive signal generating device are located in positions separated radially from the visual axis of the observer looking straight ahead, it is possible to prevent restriction of the observer's field of vision.

In cases where a circuit is required for driving the display device in accordance with signals transmitted from the drive signal generating device, this drive circuit can be integrated with the display device, or it can be integrated with the drive signal generating device, or it can be formed separately from both of these elements. In cases where a liquid crystal display panel with a back light is used for the display device, for example, then the driving circuit can be a driver for driving the liquid crystal display element.

If a circuit is required for lighting the light source for the image display light emitted from the display device in accordance with signals transmitted from the drive signal generating device, then this lighting circuit can be integrated with the display device, or it can be integrated with the drive signal generating device, or it can be formed separately from both of these elements. If a liquid crystal display panel with back light is used as the display device, for example, then the lighting circuit is a back light lighting circuit.

Desirably, the display device is located directly below the visual axis.

Thereby, it is possible to position the display device as closely as possible to the face of the observer, directly below the observer's eye. Consequently, it is possible almost completely to prevent any restriction of the observer's field of vision due to the display device.

Desirably, the optical system is coupled to the display device by means of a coupling member, in such a manner that the light path of the display light is changed directly below the visual axis. Thereby, any restriction of the observer's field of vision due to the optical system and coupling member can be reduced.

Desirably, the drive signal generating device is located behind the display device with an interval, beside the side of the head of the observer.

Thereby, the field of vision of the observer is not restricted by the drive signal generating device. Moreover, when the display device and optical system are positioned directly below the observer's visual axis, then it is possible to prevent more reliably any unbalancing effect on the observer due to the weight of the device of the present invention.

Desirably, the display light is directed towards one eye of the observer; a housing for covering the drive signal generating device is coupled to the holding member beside the side of the head of the observer; the optical system is connected to the display device in such a manner that it is located in a position separated radially from the visual axis; and the display device is movably in a spherical plane relative to the housing covering the drive signal generating device, in front of the face of the observer. According to this constitution, it is possible to move the display device along a spherical plane with respect to the drive signal generating device, in front of the observer's face. By means of this movement, the display device and optical system can be rotated about axes running in the vertical direction and lateral direction of the observer's head, at the least. Thereby, it is possible to adjust the direction of travel of the image display light whose light path is changed by the optical system. Consequently, an image can be formed in a position suitable for viewing by any observer, even if there is wide variation between the shapes of different observers' heads. Moreover, since the display device can be moved in front of the observer's face, fine adjustment of the image position can be carried out readily.

Desirably, the housing covering the drive signal generating device is coupled movably in a spherical plane to the holding member, beside the side of the head of the observer.

Thereby, the drive signal generating device can be moved in spherical plane with respect to the holding member, beside the side of the observer's head, and moreover, the display device can be moved in a spherical plane with respect to the drive signal generating device, in front of the observer's face. Consequently, fine adjustment of the image position can be carried out swiftly.

Desirably, the holding member comprises left and right side head pads which press against the left and right sides of the head of the observer in the regions surrounding the ears, and left and right holders for holding the pads, openings being formed in the center of the pads and the center of the holders, in such a manner that the ears of the observer is exposed.

Since the movement of the holding member with respect to the head is restricted by means of the holding member pressing against the head via the left and right side head pads, it is possible to prevent occurrence of shaking in the display device or optical system, thereby preventing degradation of viewing characteristics. Since the left and right side head pads press against the regions of the head surrounding the ears, the position restricting the movement of the holding member with respect to the head covers a broader range than cases where the aforementioned pads press against the ears. Consequently, movement of the holding member with respect to the head can be restricted more securely. Since an opening is formed in the center of each pad and the center of each holder, thereby exposing the observer's ears, the observer's hearing is not restricted.

Desirably, the pads and the holders have a continuous ring shape. Thereby, it is possible to restrict movement of the holding member with respect to the head, more securely.

Desirably, the pressing force exerted via the pads on the left and right sides of the head in the regions surrounding the ears is greater in front of the ears than behind the ears.

When the display device is located in front of the position at which the display unit and holding member are coupled together, and the optical system is positioned in front of the display device, then any shaking of the image can be restricted more reliably by making the pressure exerted via each pad greater in front of the ears than behind the ears.

Desirably, the holding member comprises a coupling section for coupling the left and right holders; the holders are each coupled to the coupling section, swingably about an axis in the vertical direction; and pressing sections for pressing against the holders via elastic members are provided on the coupling section, in such a manner that an elastic force is imparted causing the front side of each holder to swing towards the side of the head of the observer.

Thereby, the pressure exerted via each pad can be made greater in front of the ears than behind the ears, by the action of elastic force. Furthermore, by means of a swinging movement of the holders, each pad can be made to follow the shape of the observer's head. Therefore, shaking of the image can be restricted reliably, even if there are individual differences in head shape.

Desirably, there is provided means for imparting an elastic force which narrows the interval between the left and right holders behind the ears of the observer. Thereby, the pads can be prevented from moving away from the head in the region behind the ears, even if the pressure exerted via the pads is greater in front of the ears than behind the ears. Consequently, shaking of the image can be restricted more reliably.

Desirably, left and right upper head pads pressed against the left and right upper portions of the head of the observer are coupled to the coupling section. Thereby, movement of the holding member with respect to the head can be restricted more reliably.

According to the present invention, it is possible to provide a head-mounted display device wherein any restriction of the observer's field of vision is prevented and wearing comfort is improved, thereby reducing visual fatigue in the observer and fatigue due to the weight of the device. Moreover, it is possible to provide a head-mounted display device which ensures a sufficient field of view, reduces the burden on the observer, and enables fine adjustment of the position where display images are formed to be carried out readily and swiftly. Moreover, shaking of images can be restricted, thereby improving viewing characteristics, without restricting the observer's hearing.

DESCRIPTION OF THE PREFERRED EMBODIMENTS

Figure 1:
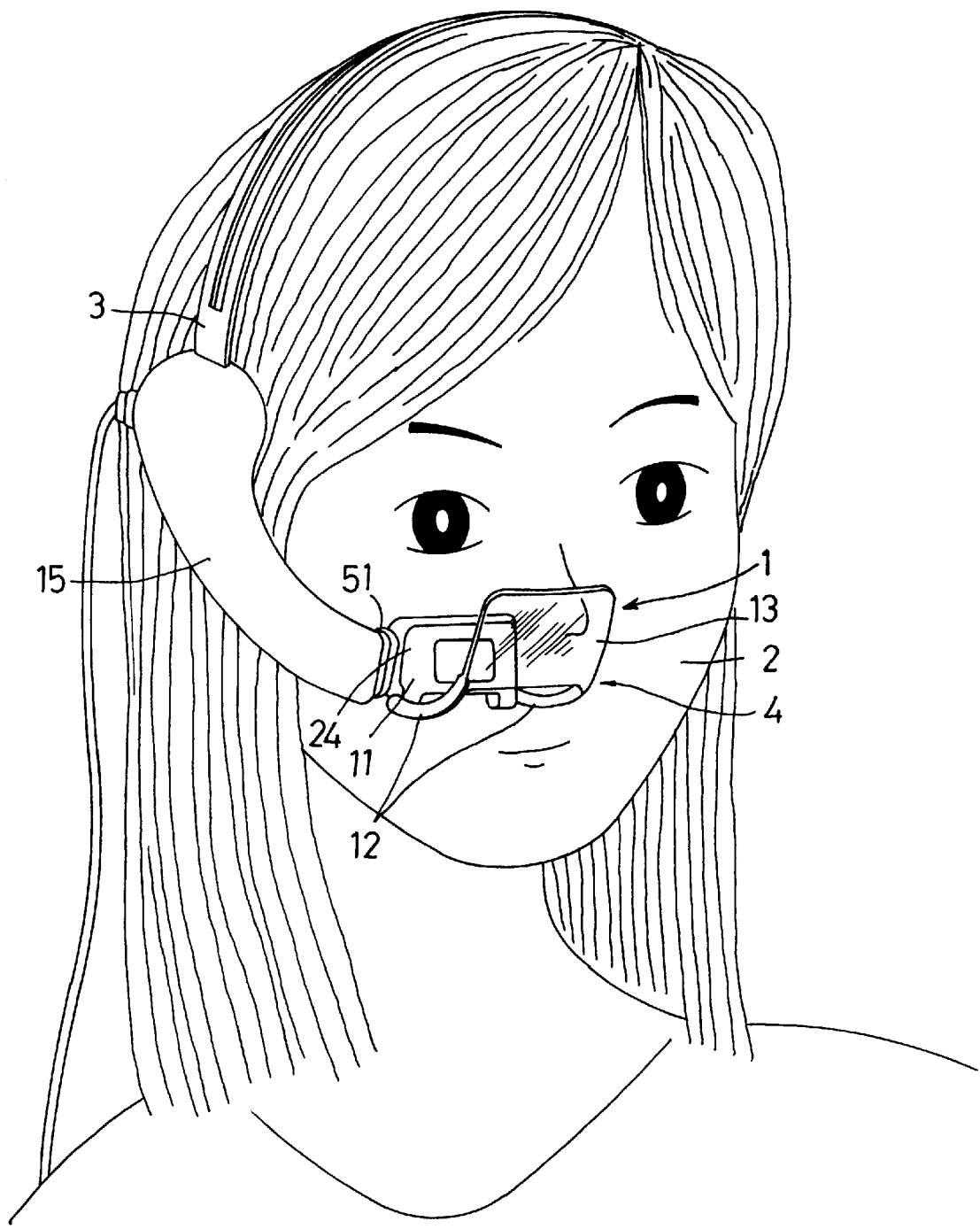
FIG. 1 is a diagram showing a head-mounted display device according to a first embodiment of the present invention in an in-use state.
Figure 2:
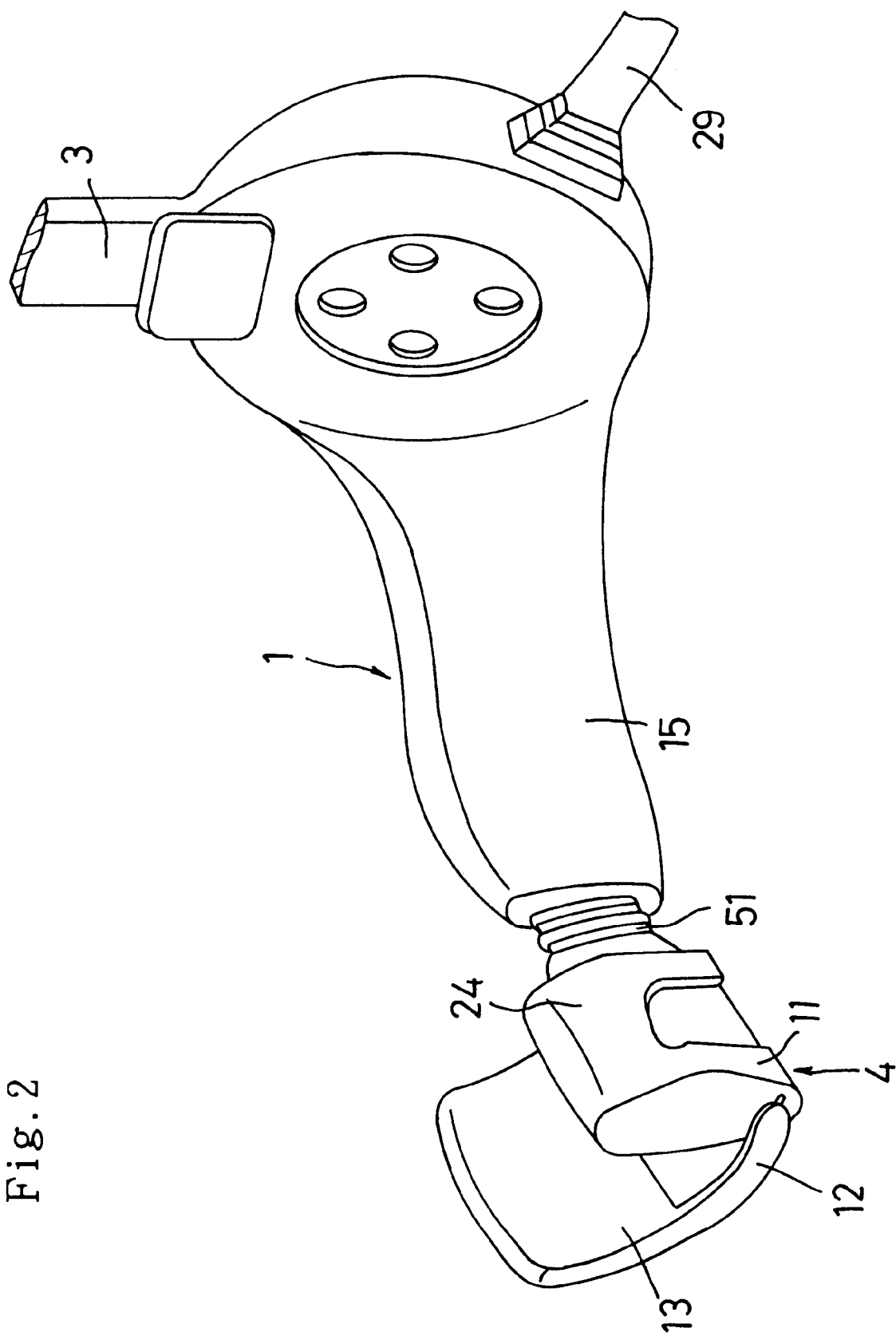
FIG. 2 is a partial oblique diagram of the head-mounted display device according to the first embodiment of the present invention.

Below, embodiments of the present invention are described with reference to the drawings.

(First Embodiment)

The head-mounted display device according to the first embodiment illustrated in FIG. 1 to FIG. 4 comprises a holding member 3, which can be worn on the head of an observer 2, and a display section 4 which is held by this holding member 3. In the head-mounted display device 1 according to this embodiment, the observer 2 is able to see an image in one eye only. Alternatively, it is possible to adopt a head-mounted display which enables the observer 2 to see an image in both eyes.

In this embodiment, the holding member 3 is a band shape which fits around the head of the observer 2 by elastic force. In this case, the holding member 3 can press against the observer's head via pads, or the like, in order to prevent the holding member 3 from slipping with respect to the head. This holding member 3 can be of any shape, provided that it can be worn on the observer's 2 head, for example, it can be a helmet shape. In the present invention, the term "head" refers to the portion of the body from the neck region upwards, including the face.

The display section 4 comprises a display device 11 for emitting image display light in a forward direction away from the observer 2; a pair of left and right arms (connecting members) 12 which extend from the front lower edge of the display device in a forward direction away from the observer 2; an optical system 13 attached to the tips of both arms 12; a drive signal generating device 14, described hereinafter, for driving the display device 11; and a housing 15 for covering this drive signal generating device 14. By this means, the display device 11, optical system 13 and drive signal generating device 14 can be worn on the head of the observer 2 via the holding member 3.

The display device 11 has a transparent type liquid crystal display panel 21 and a back light 22. In this embodiment, an X-axis driver and a Y-axis driver are integrated with the liquid crystal display panel 21. The X-axis driver and Y-axis driver drive the liquid crystal display elements in accordance with driving signals transmitted from the drive signal generating device 14. In the present embodiment, a fluorescent tube is used to constitute the back light 22. A lighting circuit for applying a high voltage to the fluorescent tube is incorporated with the back light 22. This lighting circuit is constituted by an inverter 23 comprising a switching circuit and a voltage-raising transformer. The display device 11 and inverter 23 are covered by a cover 24. This cover 24 is formed by two members 24a, 24b which are coupled together by means of screws 24c. The liquid crystal display panel 21, back light 22 and inverter 23 are held between the two members 24a, 24b. An emission window 24a' for image display light emitted from the liquid crystal display panel 21 is formed in one of the members 24a.

The optical system 13 is constituted by optical elements, such as a combiner, fully reflective mirror, or the like. This optical system 13 changes the light path of the image display light emitted from the aforementioned liquid crystal display panel 11a, in order that the light is directed towards the eye of the observer 2. When the optical system 13 is constituted by a combiner, then since it allows the light in front of itself to pass and travel to the eye of the observer 2, the observer 2 is able to see both an image and the real objects located in front of him or her. The combiner can comprise a half-mirror or hologram element, or the like. When a half-mirror is used, the light path of the image display light is changed by reflection, and when a hologram element is used, the light path of the image display light is changed by diffraction. The optical system 13 can also be constituted by a plurality of optical elements. The aforementioned arms 12 are coupled swingably about a lateral axis at the bottom edge of the cover 24, as indicated by the arrow in FIG. 3, in such a manner that the direction of travel of the display light whose path is changed by the optical system 13 can be changed and adjusted.

Figure 4:
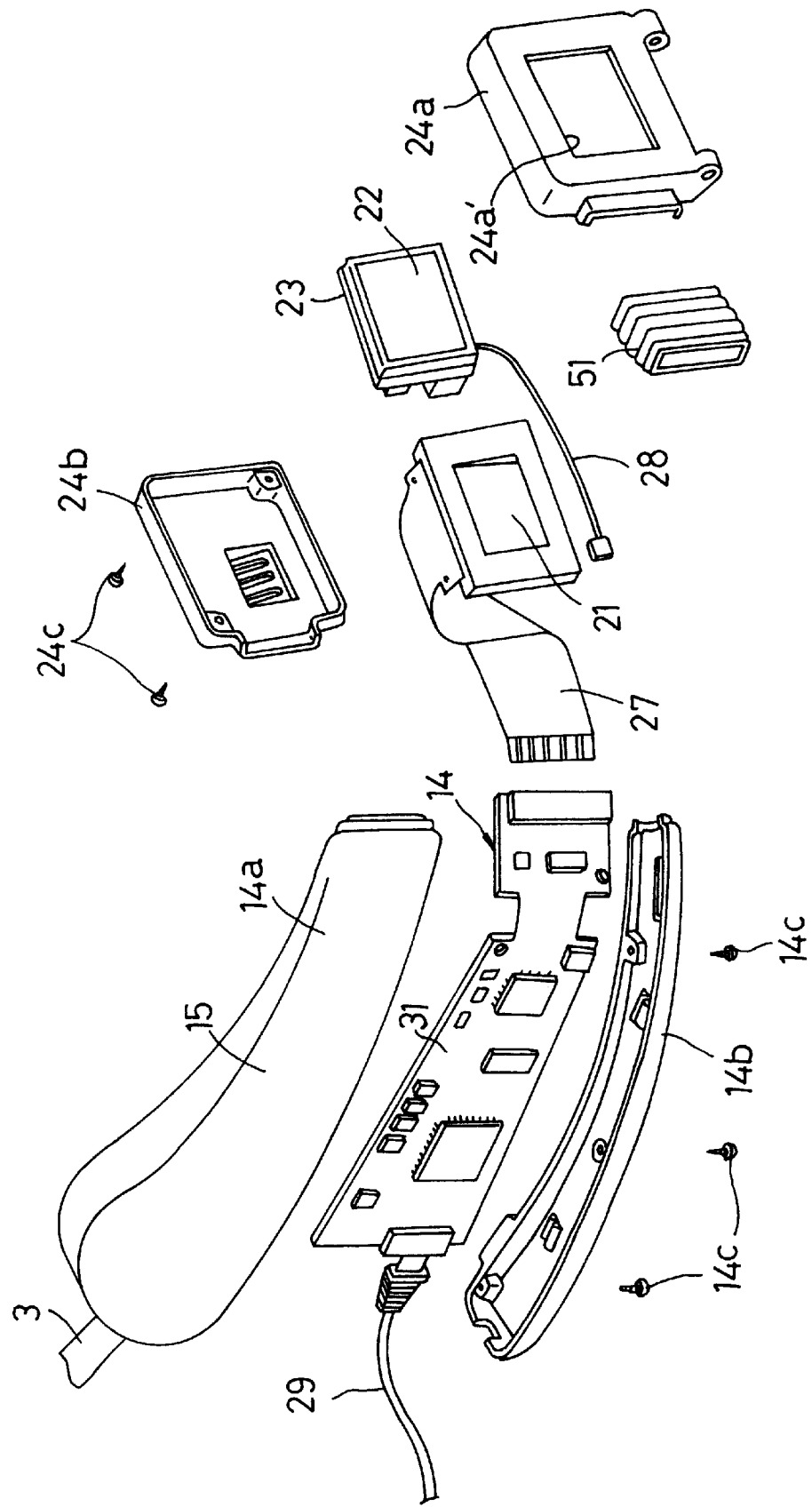
FIG. 4 is a dissembled diagram of the head-mounted display device according to the first embodiment of the present invention.

As illustrated in FIG. 4, the aforementioned driving signal generating device 14 comprises a substrate 31 fixed to the aforementioned housing 15, and a signal processing circuit provided on this substrate 31. The signal processing circuit is connected via cables 27, 28 to a display panel 21 and an inverter 23, and it is also connected via a cable 29 to a video signal generator (omitted from drawing). No particular restrictions apply to the constitution of this video signal generator, provided that it is capable of generating video signals.

The housing 15 is formed by two members 14a, 14b, which are coupled together by means of screws 14c, and it is integrated with the aforementioned holding member 3 and coupled with the cover 24 of the aforementioned display device 11 by means of a coupling member 51. This coupling member 51 is constituted by a tubular member which covers the aforementioned cables 27 and 28, and also flexible in order that the relative angle between the housing 15 and the cover 24 can be adjusted.

Figure 5:
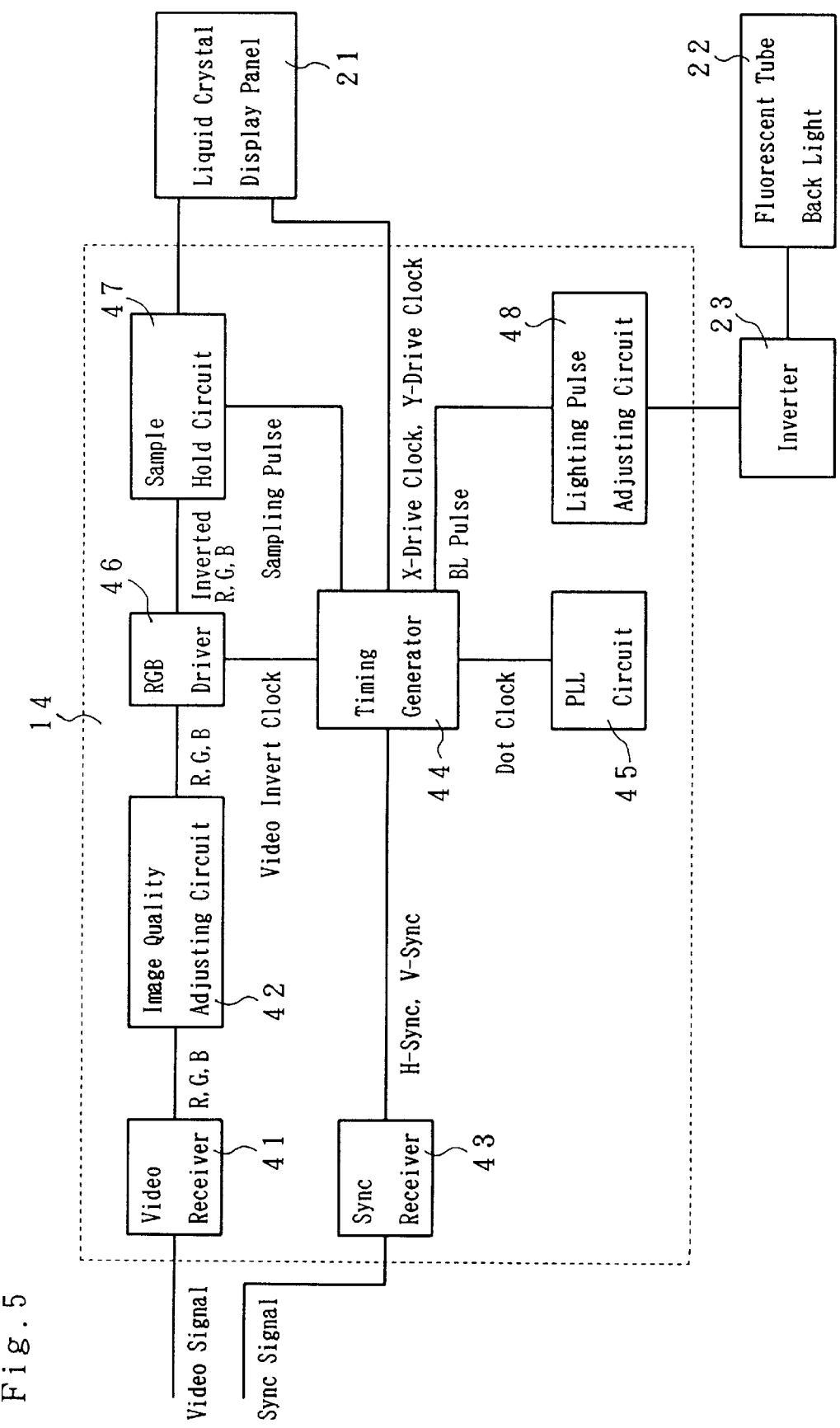
FIG. 5 is a diagram illustrating the constitution of the head-mounted display device according to the first embodiment of the present invention.

In order to generate driving signals, in the present embodiment, the signal processing circuit processes an analogue RGB signal and synchronizing signals. FIG. 5 shows a functional block diagram of a drive signal generating device 14. Specifically, an R signal (red), G signal (green), and B signal (blue) constituting the video signal are converted to an appropriate signal amplitude by a video receiver 41, and adjustments to contrast, gamma correction, and the like, are made by means of an image quality adjusting circuit 42.

The horizontal and vertical synchronizing signals contained in the video signal are converted to appropriate signal voltages (H-sync, V-sync) by a sync receiver 43 and then input to a timing generator 44.

The timing generator 44 generates a Video Invert Clock, Sampling Pulse, BL Pulse (back light lighting pulse), and Drive Clocks for the liquid crystal display panel 21, on the basis of a dot clock output by a PLL circuit 45.

The RGB signal output by the image quality adjusting circuit 42 is converted to a signal amplitude suitable for input to the liquid crystal display panel 21 by an RGB driver 46, in accordance with the image inversion clock input by the timing generator, and it is then phase-expanded by a sample hold circuit 47 in timing with a sampling pulse, and input to the liquid crystal display panel 21. This phase expansion is generally carried out in accordance with the image input characteristics of the liquid crystal display, and in liquid crystal display panels showing high-resolution image signals, for example, the image signal is often expanded into a 4-phase to 6-phase signal. In liquid crystal display panels showing relatively low-resolution image signals, such as NTSC signals, or the like, phase expansion is unnecessary, and in such cases, the sample hold circuit becomes obsolete.

The timing generator 44 outputs clocks for driving the liquid crystal display panel 21, in the form of an X-axis drive signal (X-Drive Clock) transmitted to the X-axis driver, and a Y-axis drive signal (Y-Drive Clock) transmitted to the Y-axis driver.

The X-axis drive signal, Y-axis drive signal and the phase-expanded RGB signal are input to the X-axis driver and Y-axis driver of the liquid crystal display panel 21. An image is displayed by means of the liquid crystal display elements in the liquid crystal display panel 21 being moved by these drivers.

The back light lighting pulse output by the timing generator 44 is converted by a lighting pulse adjusting circuit 48 to a suitable pulse duty or pulse cycle (lighting and extinguishing cycle) according to the brightness setting of the back light 22, and the converted pulse is then input to the inverter 23. Thereby, the back light 22 is lit and image display light is emitted from the liquid crystal display panel 21.

In other words, the drive signal generating device 14 generates signals transmitted to the X-axis driver, the Y-axis driver and the inverter 23, as driving signal for the display device 11.

The X-axis driver and Y-axis driver can be constituted separately from the liquid crystal display panel 21, and furthermore, the inverter 23 can be constituted separately from the back light 22, and located in the housing 15.

The constitution of the signal processing circuit is not limited to that described above, and any constitution suited to a display device and image signal can be adopted.

Figure 3:
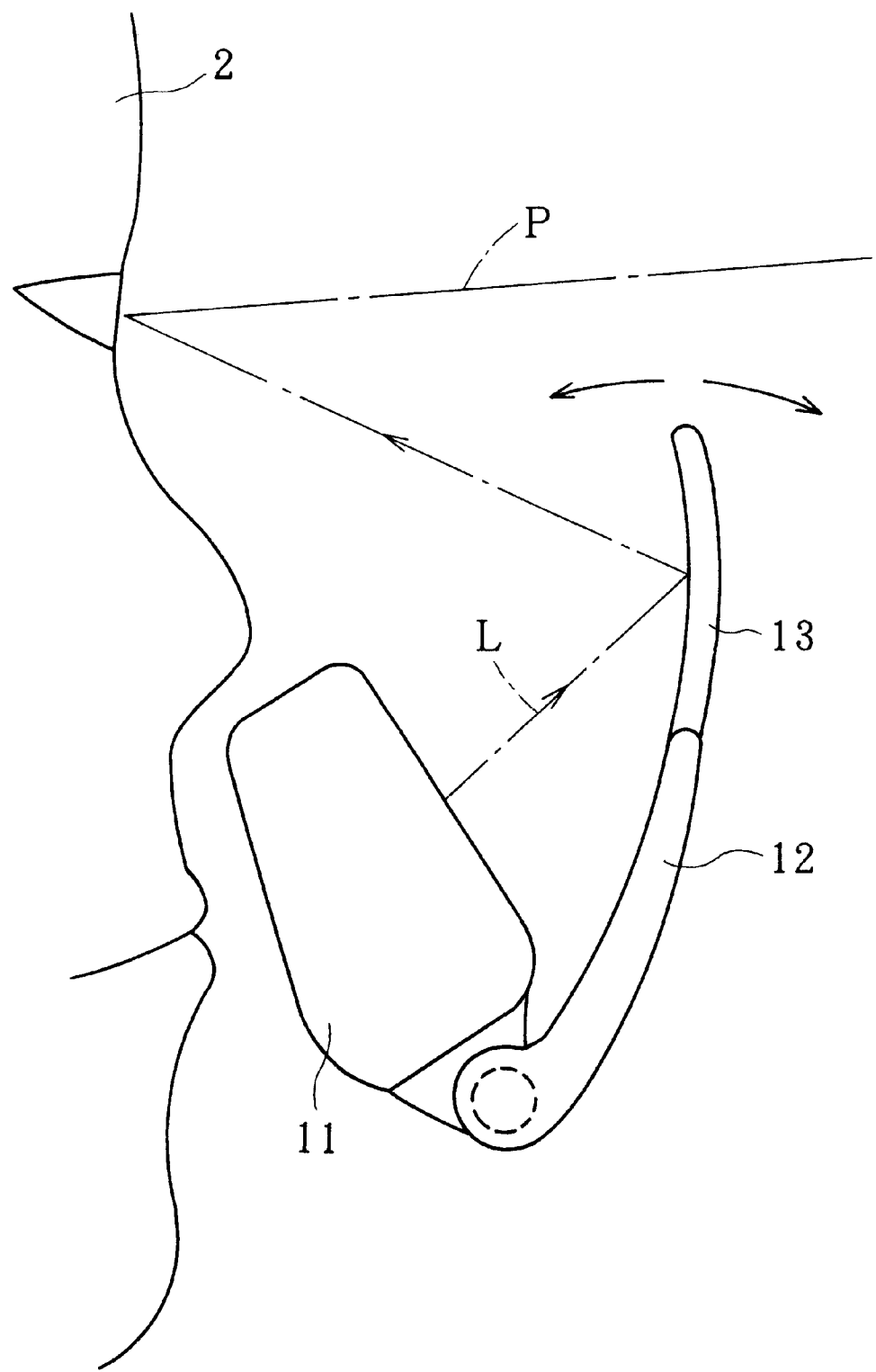
FIG. 3 is a diagram illustrating the action of the head-mounted display device according to the first embodiment on the present invention.

In a state where the aforementioned head-mounted display device 1 is being worn by the observer 2, as illustrated in FIG. 3, the display device 11 is positioned in front of the observer's face, and display light L is emitted in a forward direction from a position which is separated radially from the visual axis P of the observer 2 when looking straight ahead. Therefore, the display device 11 is located between the left and right-hand sides of the observer's head in a position directly below the visual axis P of the observer 2. The optical system 13 is located in front of the display device 11 with an interval. Thereby, the optical system 13 changes the light path of the display light L at a position between the left and right-hand sides of the observer's head and also directly below the observer's visual axis P. The drive signal generating device 14 described above is located in a position which is separated radially from the visual axis P, and separated with an interval from behind the display device 11, in other words, a position beside the side of the observer's 2 head. Cushioning members, such as sponge, rubber, or the like, can be provided on the section of the housing 15 which faces to the observer's ears.

According to the foregoing constitution, the image display light L emitted from the display device 11 travels forwards from a position separated radially from the visual axis of the observer 2 looking straight ahead, whereupon the light path thereof is changed by the optical system 13 and it is directed towards the eye of the observer 2. Thereby, the observer 2 sees an image. In the present embodiment, the plane containing the central axis of the light path of the image display light L and the aforementioned visual axis P lies in a vertical plane. Since the display device 11, the optical system 13 and the drive signal generating device 14 are separated from each other by intervals, it is possible to prevent the weight of the device 1 from having an unbalancing effect on the observer 2. Since the display device 11 and drive signal generating device 14 are located in a position which is separated radially from the visual axis P, it is possible to prevent restriction of the observer's 2 field of vision. In particular, by positioning the display device 11 directly below the visual axis P, the display device 11 can be brought as close as possible to the face of the observer 2, in a position directly below the observer's 2 eye. Thereby, it is possible to prevent, almost completely, any restriction of the observer's 2 field of vision due to the display device. The optical system 13 is coupled to the display device 11 by means of the arms 12 directly below the visual axis P, in such as manner that the light path of the display light L can be changed thereby. Therefore, it is possible to prevent any restriction of the observer's 2 field of vision by the optical system 13 and arms 12. Since the drive signal generating device 14 is located beside the side of the observer's 2 head, there is no restriction of the observer's 2 field of vision by the drive signal generating device 14, and moreover, in this case where the display device 11 and optical system 13 are located directly below the visual axis P, it is possible reliably to prevent the weight of the device 1 from having an unbalancing effect on the observer 2.

(Second Embodiment)

Figure 6:
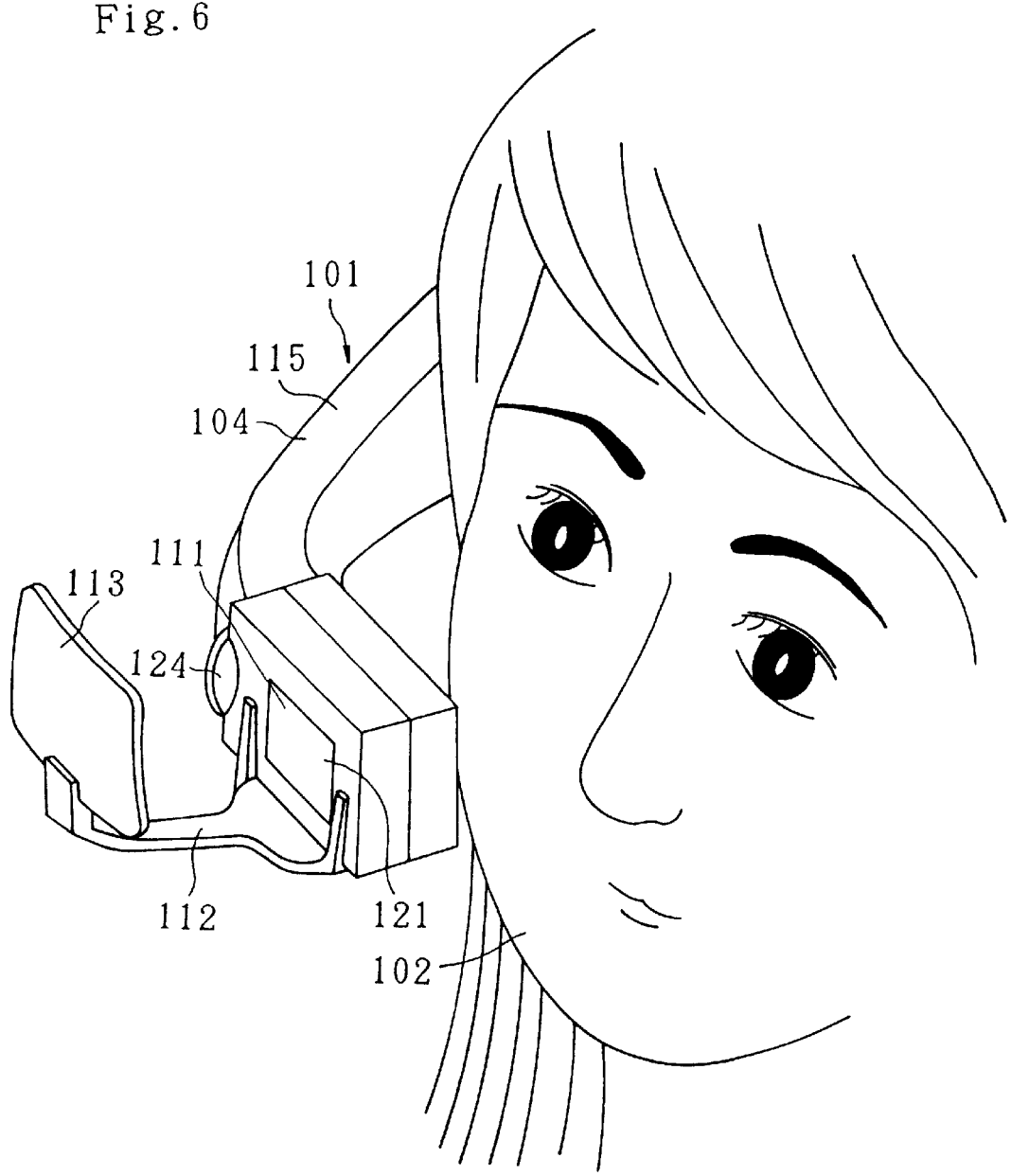
FIG. 6 is an oblique view of a head-mounted display device according to a second embodiment of the present invention.
Figure 7:
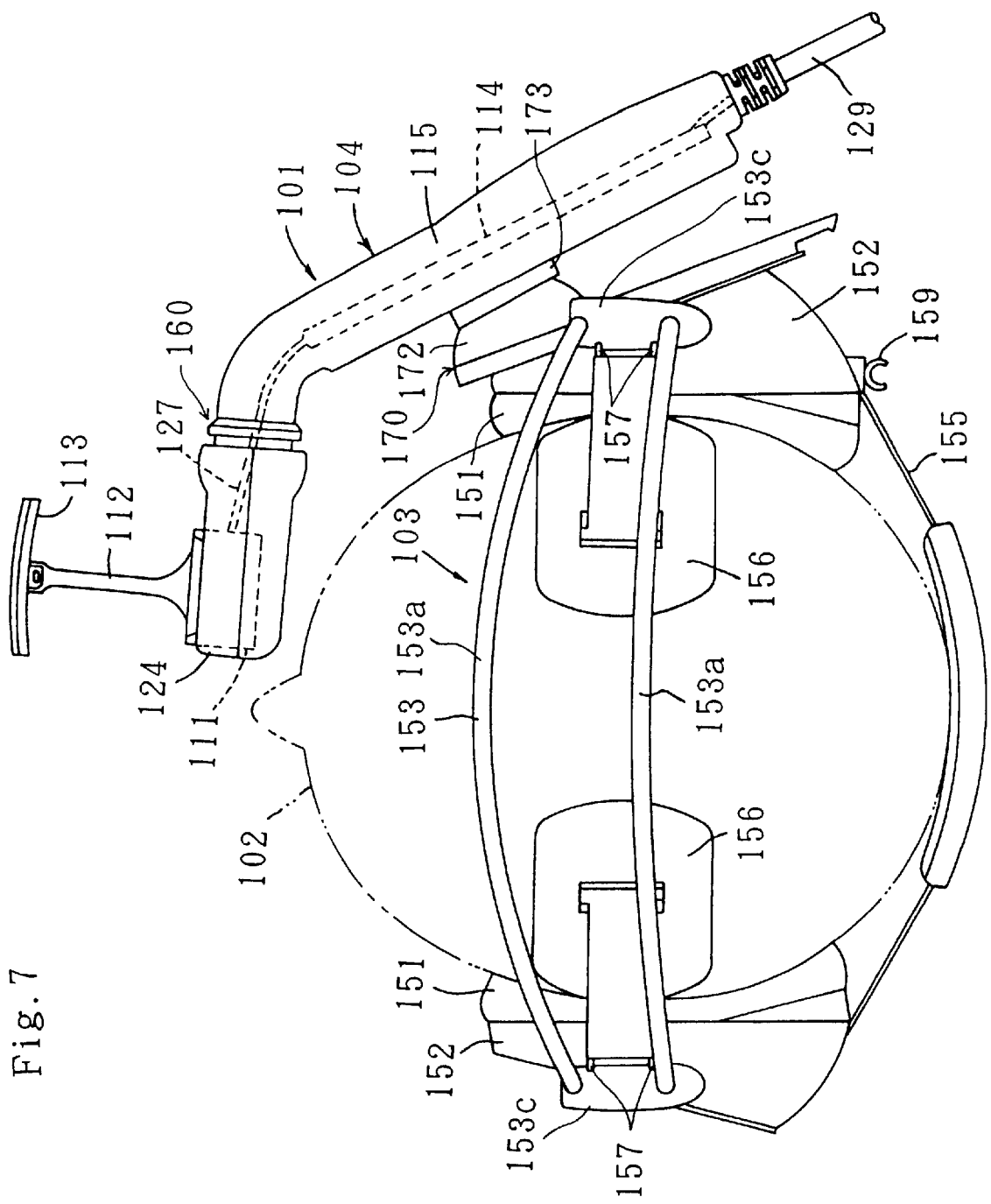
FIG. 7 is a plan view of the head-mounted display device according to the second embodiment of the present invention.
Figure 8:
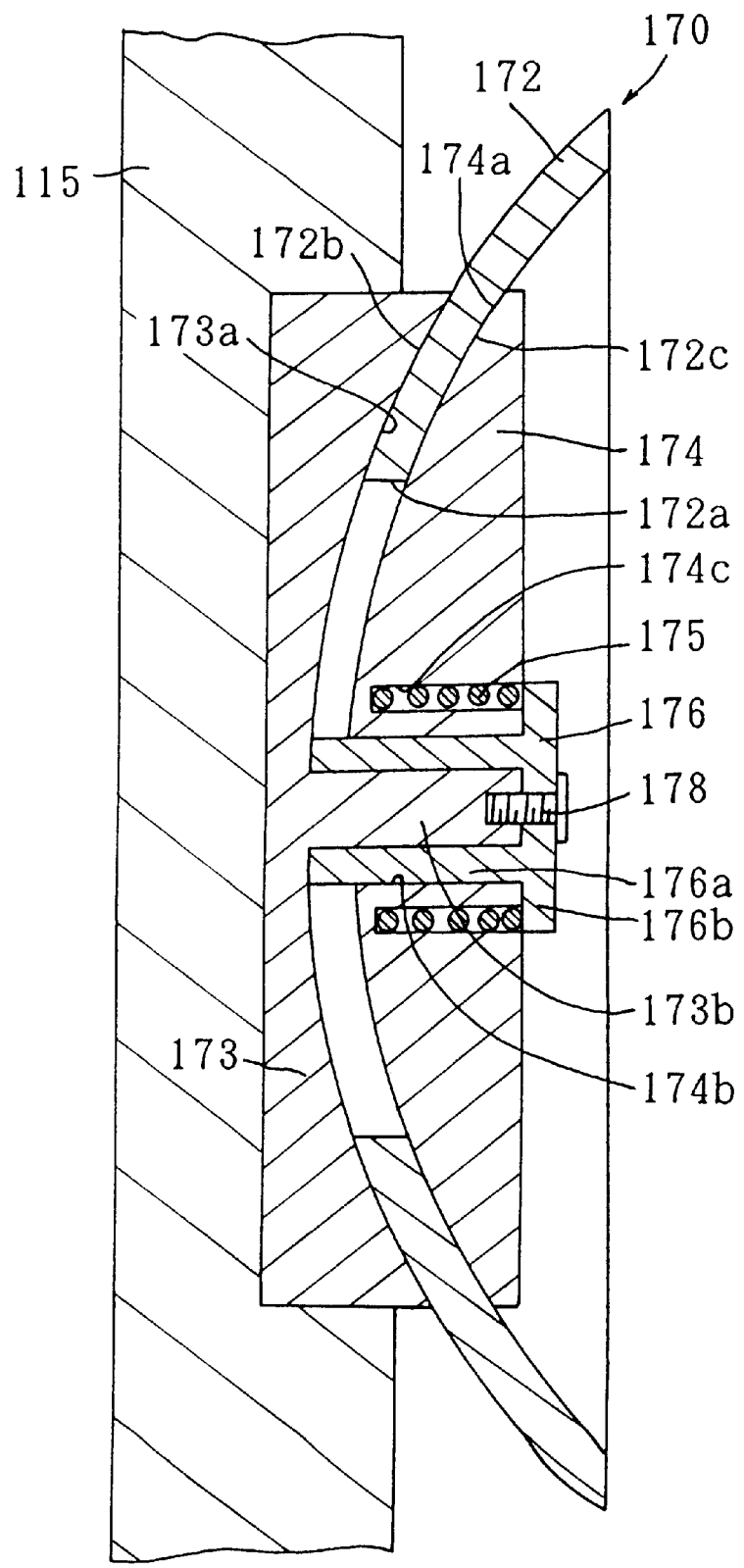
FIG. 8 is a partial sectional view of the head-mounted display device according to the second embodiment of the present invention.

The head-mounted display device 101 according to a second embodiment illustrated in FIG. 6 and FIG. 7 comprises a holding member 103 which is worn on the head of an observer 102, and a display unit 104 which is coupled to the holding member 103 beside one side of the observer's 102 head.

The holding member 103 comprises left and right side head pads 151, left and right holders 152, a coupling section 153, a rear head belt 155 and left and right upper head pads 156. The left and right side head pads 151 press against the left and right sides of the head of the observer 102, in the regions surrounding the ears. The left and right holders 152 hold the respective side head pads 151. The coupling section 153 couples the left and right holders 152. The left and right upper head pads 156 are coupled together by the coupling section 153 and they press against the left and right upper parts of the head of the observer 102. The rear head belt 155 is positioned at the rear of the head and is coupled to the two holders 152.

The coupling section 153 is constituted by a pair of bands 153a, which are located above the top of the head and separated to each other by an interval in the longitudinal (front/back) direction of the head, and left and right coupling plates 153c which are integrated with the respective ends of the both bands 153a. By coupling the left and right holders 152 together by means of this coupling section 153, the interval between the left and right side pads 151 can be made smaller than the width of the head of the observer 102. This interval between the left and right side head pads 151 can be enlarged by elastic deformation of the bands 153a. Thereby, it is possible to make the left and right side head pads 151 press against the left and right side of the observer's 102 head in the region of the ears, by means of the elastic force generated by the elastic deformation of the bands 153a.

The display unit 104 comprises a display device 111 covered by a casing 124, an optical system 113, a coupling member 112 for connecting the display device 111 with the optical system 113, and a drive signal generating device 114 for the display device 111, and can be worn on the head of the observer 102 by means of the holding member 103. The display device 111 emits image display light in a forward direction, from a position in front of a point at which the display unit 104 are connected with the holding member 103. The optical system 113 changes the path of the image display light in front of the display device 111, in order that the image display light emitted from the display device 111 is directed towards one of the eyes of the observer 102.

The display device 111 can be constituted by a commonly known liquid crystal display with a back-light, for example. This display device 111 emits image display light in response to drive signals transmitted from the drive signal generating device 114 via a cable 129.

The coupling member 112 extends from the lower portion of the casing 124 of the display device 111 in a forward direction away from the observer 102. The optical system 113 is attached to the front end of the coupling member 112.

The optical system 113 can be constituted by a single optical element, such as a combiner, fully reflective mirror, or the like. If a combiner is used for the optical system 113, then since it transmits light coming from the forward direction and allows the light to reach the observer's 102 eye, the observer is able to see both the image and any real objects located in front of him or her. The combiner can be constituted by a half-mirror or a hologram element. When a half mirror is used, the light path of the image display light is changed by reflection, and when a hologram element is used, the light path of the image display light is changed by diffraction. Preferably, the reflective surface of the optical element 113 is aspherical, in order that an image can be formed cleanly at a position that is distant from the observer's 102 eye.

The drive signal generating device 114 is connected to an video signal generator (omitted from drawings) via a cable 129, and comprises a circuit for generating drive signals for the display device 111 in accordance with the video signals from the video signal generator, and the circuit is covered by a housing 115. The cable 129 can be held by a cable clamp 159 attached to the holder 152. No particular restrictions apply to the constitution of the video signal generator, provided that it is capable of generating video signals, and it can, for example, be constituted by a computer which outputs video signals. The related circuitry is constituted similarly to that in the first embodiment.

The housing 115 is coupled to the holding member 103 beside one side of the observer's 102 head, in such a manner that it can move in a spherical plane. Specifically, the coupling mechanism 170 comprises a receiving member 172 which is connected to the holding member 103, a joining member 173 which is integrated with the aforementioned housing 115, a retainer 174, a compression coil spring 175, and a spring pressure plate 176. The receiving member 172 is a ring shape having a center hole 172a. One side of the receiving member 172 is formed into a receiving member-side first sliding face 172b consisting of a portion of a spherical face. Furthermore, the other side of the receiving member 172 is formed into a receiving member-side second sliding face 172c consisting of a portion of a spherical face which is concentric with the aforementioned spherical face. The surface of the joining member 173 is formed into a joining member-side sliding face 173a consisting of a portion of a spherical face which is concentric with the aforementioned spherical face. A column section 173b is formed on this joining member-side sliding face 173a. The central axis of this column section 173b passes through the center of the spherical faces. One side of a retainer 174 is formed into a retainer-side sliding face 174a consisting of a portion of a spherical surface which is concentric with the aforementioned spherical surface. The retainer 174 comprises a center hole 174b, and a spring insertion cavity 174c surrounding this center hole 174b. The spring pressure plate 176 comprises a tubular section 176a and a flange section 176b on one end of the tubular section 176a. The aforementioned column section 173b passes through the center hole 172a in the receiving member 172, the center hole 174b in the retainer 174, and the tubular section 176a of the spring pressure plate 176. When the compression coil spring 175 is inserted into the spring insertion cavity 174c of the retainer 174, it is prevented from coming loose by means of the flange section 176b of the spring pressure plate 176. The spring pressure plate 176 is fixed to the column section 173b by means of a screw 178. The diameter of the center hole 172a of the receiving member 172 is formed sufficiently larger than the diameter of the tubular section 176a of the spring pressure plate 176, in order that the aforementioned housing 115 is able to move in a spherical plane. Due to the elastic force of the spring 175, the retainer-side sliding face 174a is pressed against the receiving member-side second sliding face 172c, and the receiving member-side first sliding face 172b is pressed against the joining member-side sliding face 173a. Thereby, the joining member 173 is able to move in a spherical plane relative to the receiving member 172, by means of the sliding faces 173a, 172b, 172c, 174a, under the action of suitable frictional force. Therefore, it is possible to rotate the display unit 104 about axes in the vertical direction, lateral direction, and longitudinal direction of the observer's head.

Figure 9:
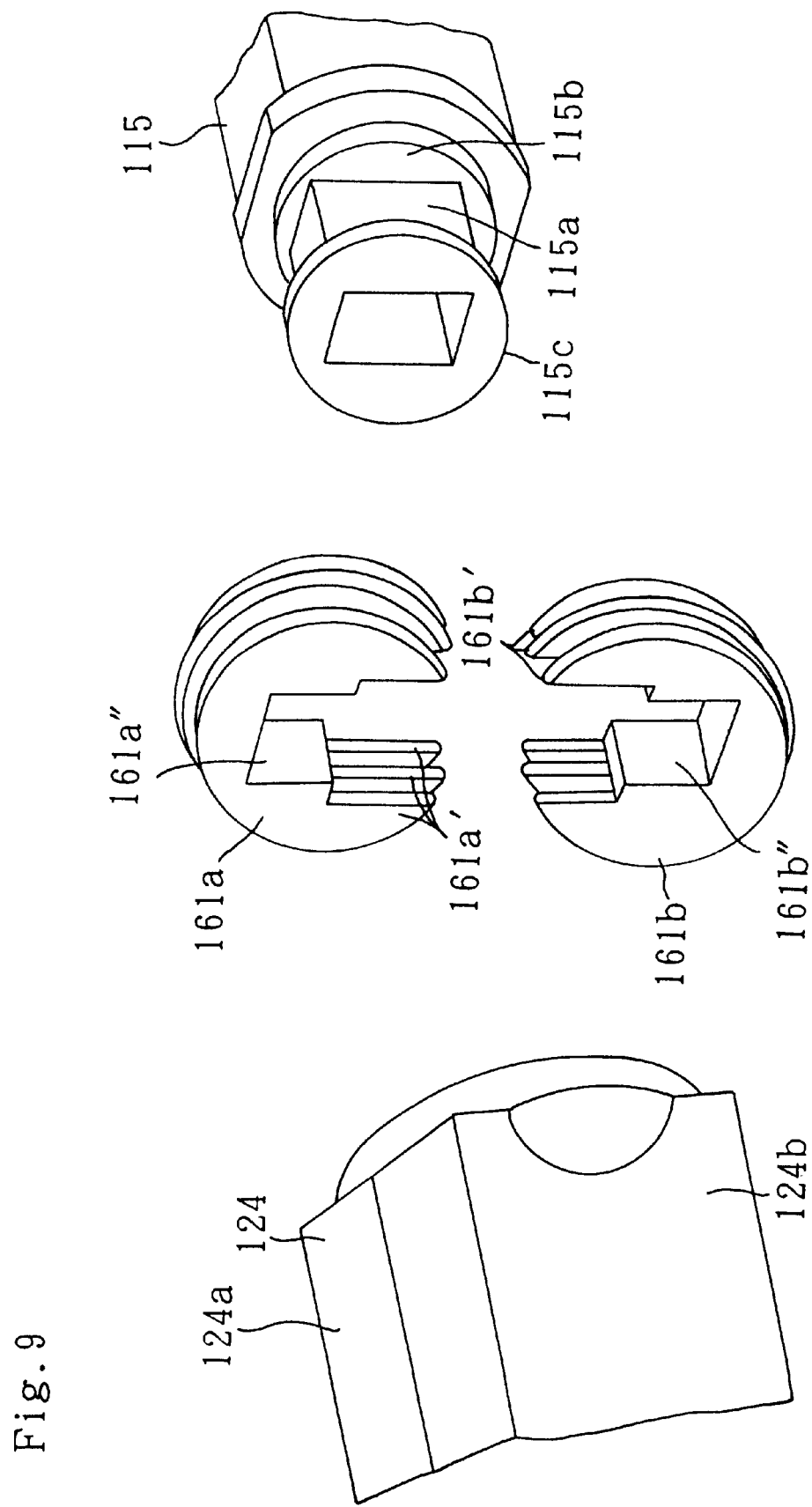
FIG. 9 is a dissembled oblique diagram of principal parts of the head-mounted display device according to the second embodiment of the present invention.
Figure 10:
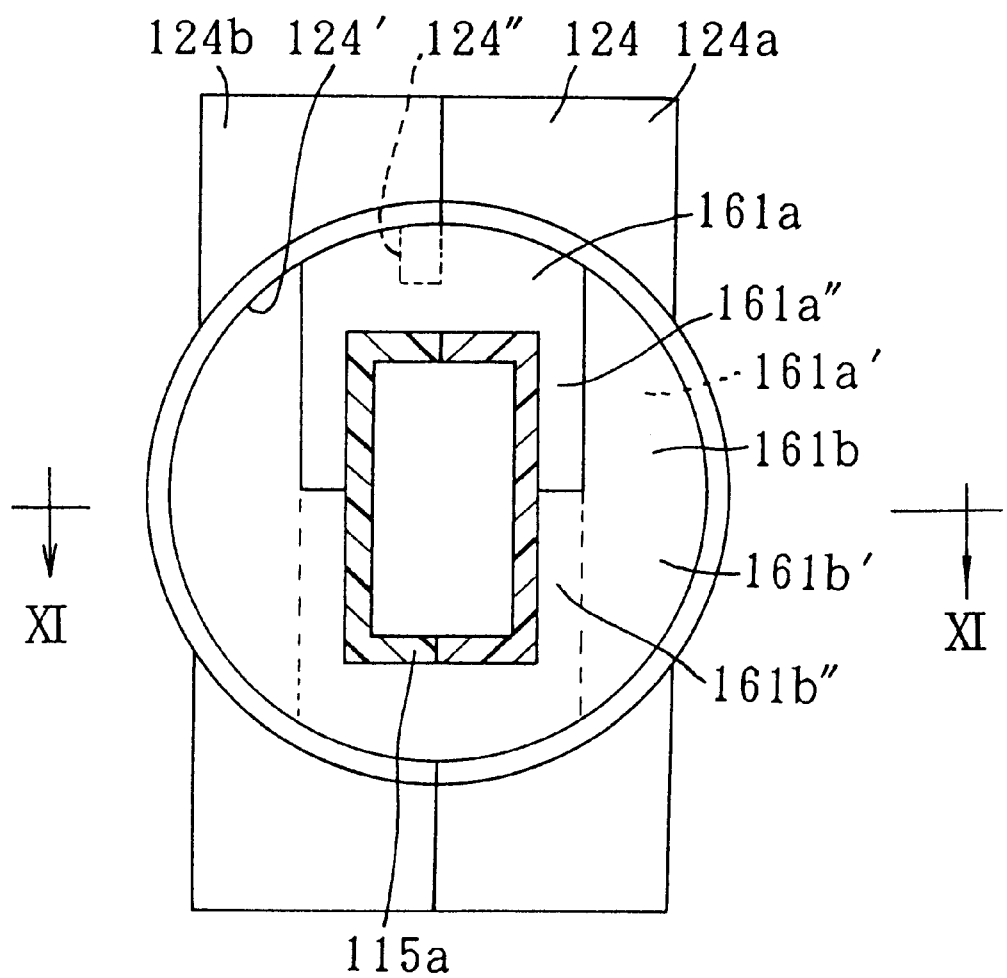
FIG. 10 is a sectional view of principal parts of the head-mounted display device according to the second embodiment of the present invention.
Figure 11:
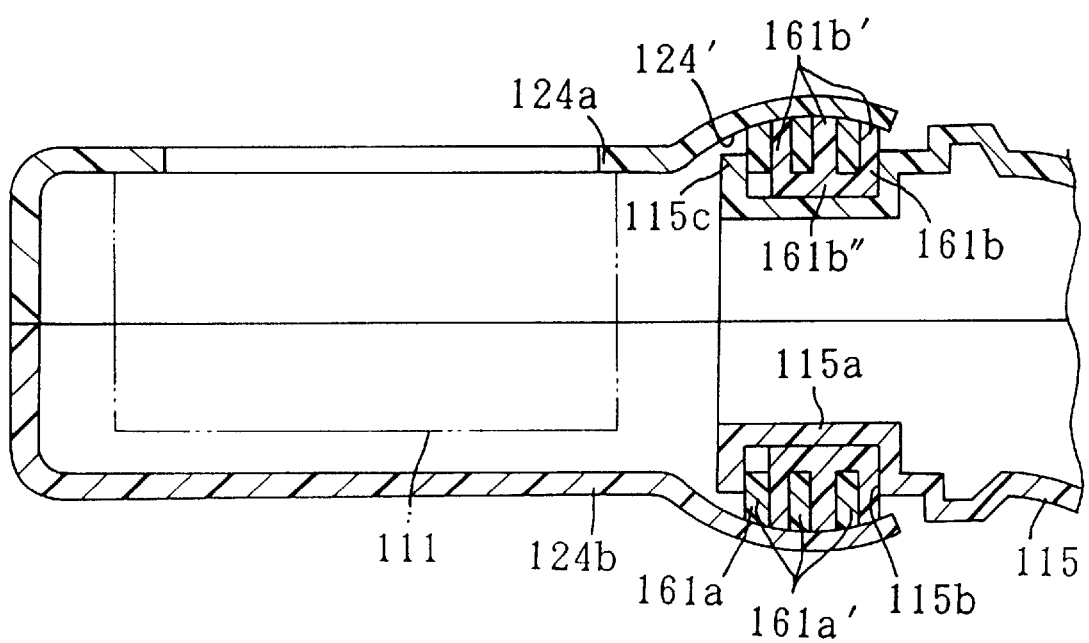
FIG. 11 is a sectional view along XI—XI in FIG. 10.

The display device 111 is coupled to the aforementioned drive signal generating device 114 via a connecting mechanism 160 in front of the observer's 102 face, in such a manner that it can move in a spherical plane. Specifically, as illustrated in FIG. 9 to FIG. 11, the connecting mechanism 160 comprises a pair of connecting plates 161a and 161b. Each of the connecting plates 161a, 161b comprises a plurality of approximately U-shaped plate-like guide sections 161a', 161b', and coupling sections 161a'', 161b'' of these guide sections 161a', 161b'. In both of the connecting plates 161a, 161b, these plate-like guide sections 161a', 161b' are aligned in parallel and spaced at intervals with respect to each other. The aforementioned housing 115 is approximately L-shaped in plan view, so that it has portion opposite to the observer's 102 face and portion opposite to one side of the observer's 102 head. The front end region of the housing 115 is formed into a receiving section 115a. The coupling sections 161a'', 161b'', of the aforementioned connecting plates 161a, 161b fit together with this receiving section 115a. In this way, the guide sections 161a' of one of the connecting plates 161a and the guide sections 161b' of the other of the connecting plates 161b are aligned alternately such that they hold each other in an interleaved manner. The connecting plates 161a, 161b are held inbetween a step section 115b and a front end flange 115c formed on the outer circumference of the housing 115. The outer faces of the guide sections 161a' and 161b' are spherical in shape. The inner face of the casing 124 of the aforementioned display device 111 has a spherically shaped receiving face 124' which contacts the spherical face traced by the outer faces of these guide sections 161a', 161b'. This casing 124 is formed by coupling together two members, a front and a back member 124a, 124b, by means of screws (omitted from drawing), such that the guide sections 161a', 161b' are held between the members. In this way, the receiving face 124' engages with the outer faces of the guide sections 161a', 161b'. The diameter of the sphere traced by the outer faces of the guide sections 161a', 161b' is set such that it is greater than the diameter of the sphere traced by the receiving face 124'. The two connecting plates 161a, 161b are made of an elastic material and desirably, they are made of a synthetic resin material, such as polyacetal, or the like, which has self-lubricating properties and excellent wear characteristics. Thereby, the outer faces of the guide sections 161a', 161b' are pressed against the receiving face 124' due to the elasticity of the connecting plates 161a, 161b. Consequently, the display device 111 is able to move in a spherical plane relative to the housing 115 by means of the sliding faces formed in a spherical plane, under the action of a suitable frictional force. In other words, the display device 111 and the optical system 113 can be rotated about axes extending in the vertical direction, lateral direction and longitudinal direction of the observer's 102 head. It is sufficient when the display device 111 and optical system 113 are rotatable about axes extending in the vertical direction and lateral direction of the head of the observer 102, at the least. As shown in FIG. 10, a stopper 124" is provided in the casing 124. Rotation about the axis running in the lateral direction is restricted to a certain range by contacting this stopper 124" with the inside of one of the U-shaped guide sections 161a'. Rotation about the axis running in the vertical direction and rotation about the axis running in the longitudinal direction is restricted to a certain range by contacting the casing 124 with the housing 115.

Figure 12:
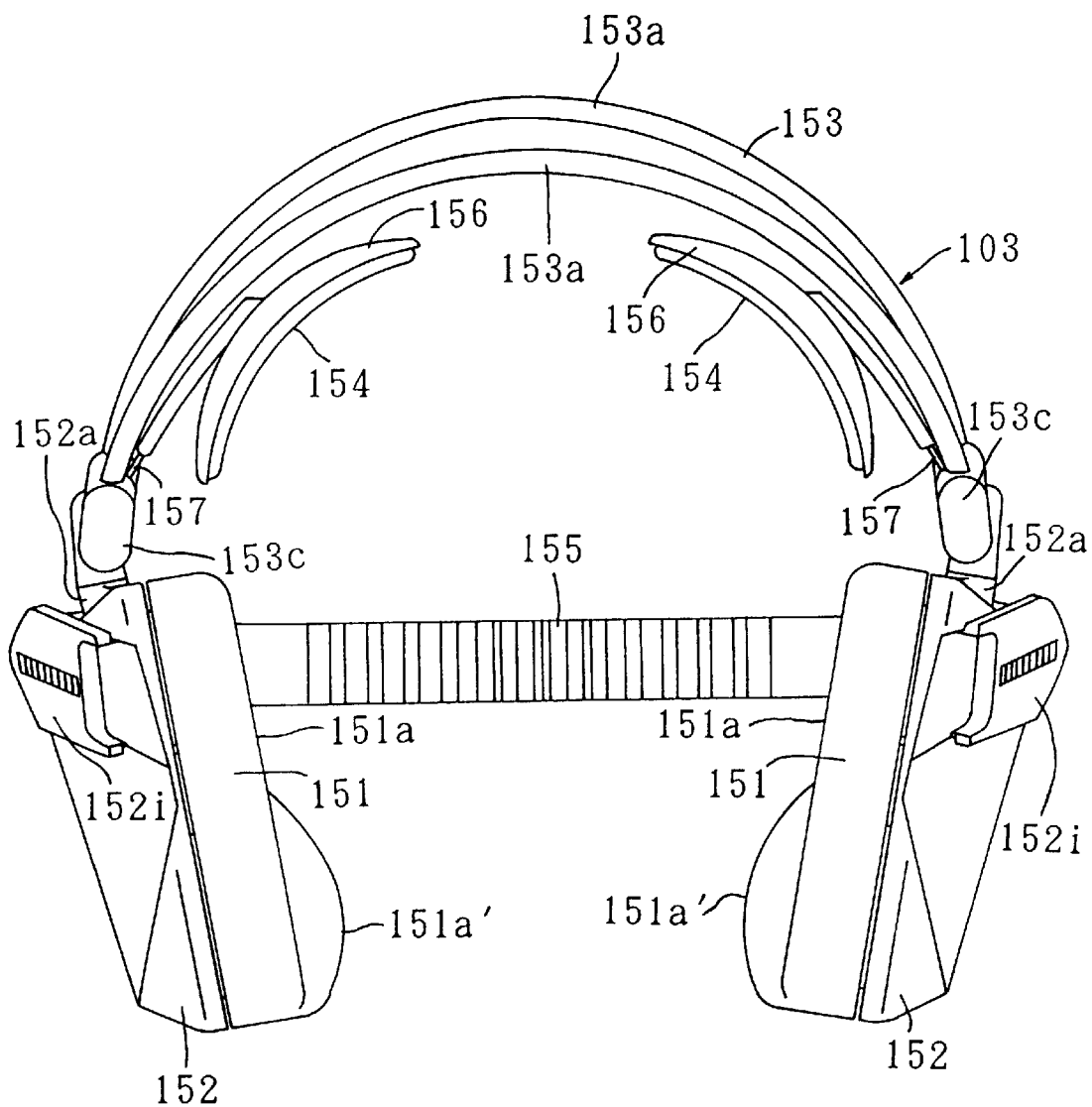
FIG. 12 is a front view of the head-mounted display device according to the second embodiment of the present invention.
Figure 13:
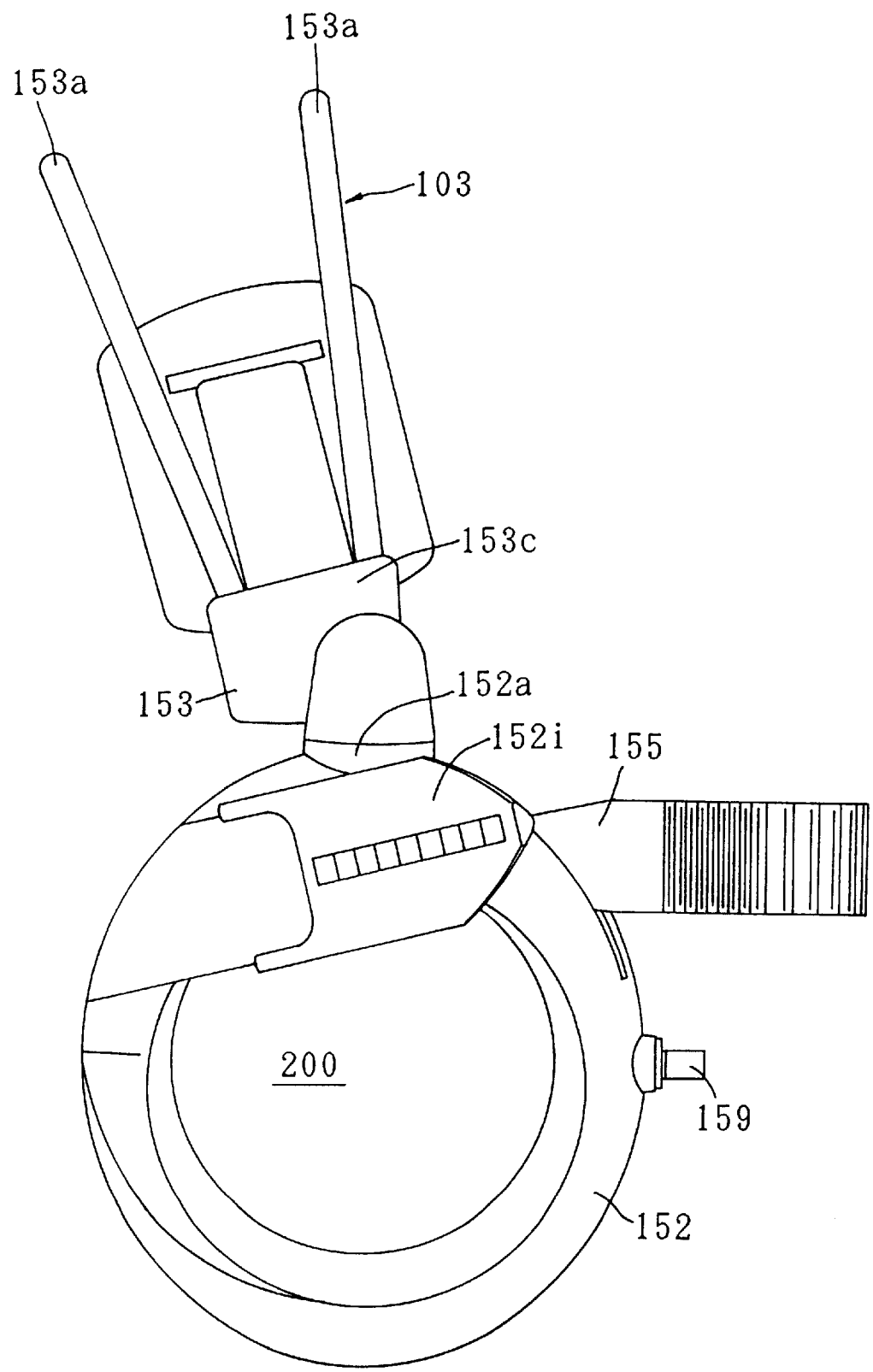
FIG. 13 is a side view of the head-mounted display device according to the second embodiment of the present invention.

As shown in FIG. 12 and FIG. 13, both of the side head pads 151 and the holders 152 have a continuous ring shape. The pads 151 are attached to the inner sides of the holder 152. Thereby, the side head pads 151 press against the sides of the observer's 102 head, such that they surround the ears completely. The center of the side head pads 151 and the center of the holders 152 are provided with openings 200, in such a manner that the ears E of the observer 102 are exposed. Alternatively, the side head pads 151 and the holders 152 can also be formed, for example, in a polygonal ring shape.

At least one of the thickness of the side head pads 151 and the thickness of the holders 152 is set in such a manner that the pressure surface 151a of each side head pad 151 follows the shape of the side of the head of the observer 102. Specifically, in the side regions of the human head surrounding the ears, there is a depression at the lower rear portion of the ear. Therefore, as shown in FIG. 12, the portion 151a' of the pressure surface 151a which presses against the lower rear portion of the ear projects inwards further than the rest of the pressure surface 151a. Consequently, in the present embodiment, the thickness of the side head pads 151 is made uniform, whilst the thickness of the holders 152 is made greater at the lower rear portion of the ears than in the rest of the holders. It is also possible to make the thickness of the holders 152 uniform, and to make the thickness of the side head pads 151 greater at the lower rear portion of the ears than in the rest of the holders. In anyway, the total thickness of the side head pad 151 and holder 152 in the lower rear portion of the ear should be greater than the total thickness of the side head pad 151 and holder 152 in the other regions thereof.

The pressing force with the side head pads 151 in the region surrounding the ears is greater in front of the ears than behind the ears.

Figure 14:
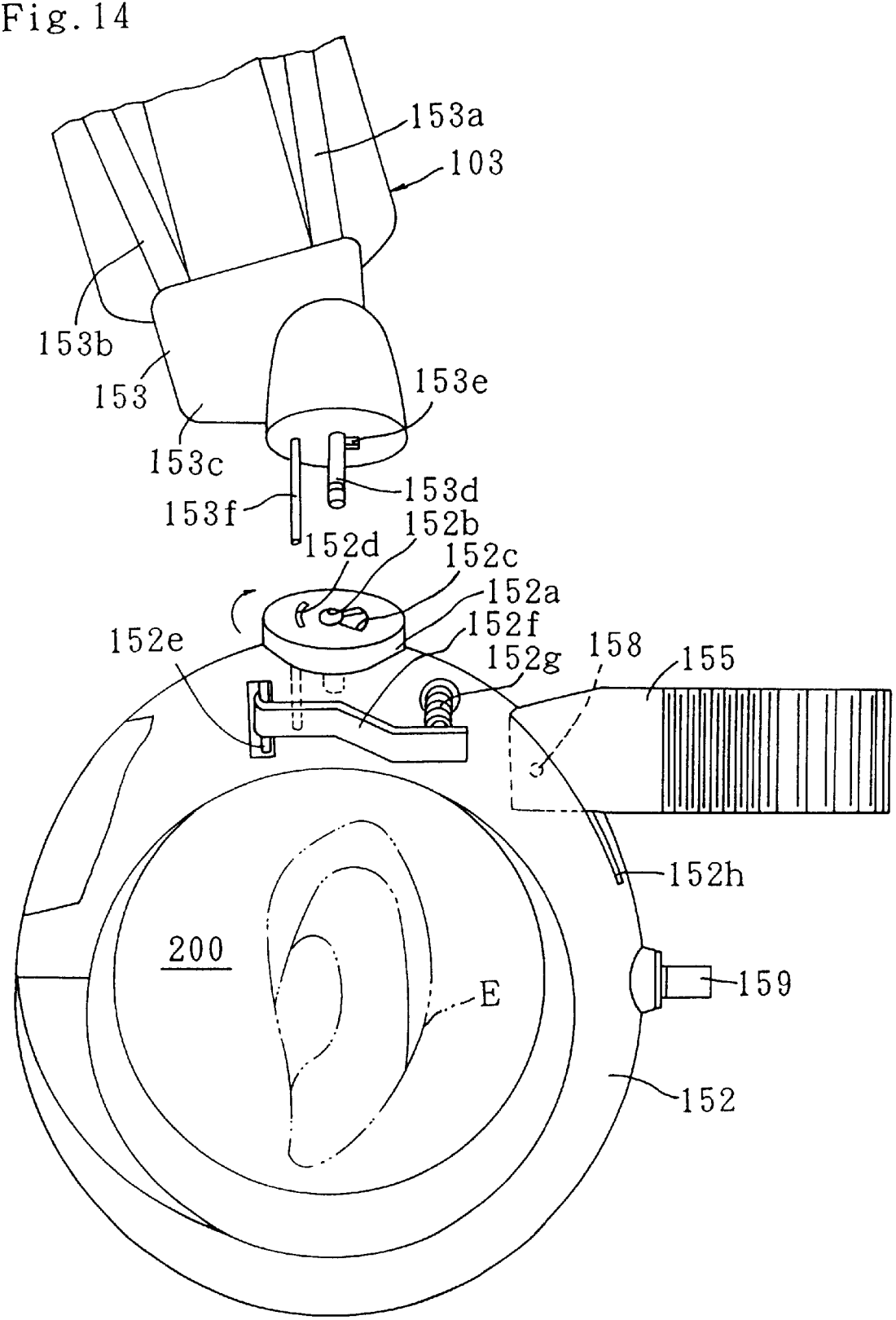
FIG. 14 is a dissembled oblique view of the head-mounted display device according to the second embodiment of the present invention.

Specifically, as illustrated in FIG. 14, a coupling shaft 153d, swing restrictor 153e and column-shaped pressing section 153f are provided on the lower face of both connecting plates 153c, such that they project in a downward direction.

A receiving section 152a is provided on each holder 152. The upper face of this receiving section 152a receives the lower face of the coupling shaft 153d. A supporting hole 152b, a cavity 152c which is fan-shaped in plan view, and a guide hole 152d which is arc-shaped in plan view, are provided in this receiving section 152a.

A support shaft 152e is attached to the outer side of each holder 152. A spring receiving plate 152f is coupled to this support shaft 152e, swingably about a vertical axis. A compression spring 152g (elastic member) attached to the holder 152 is sandwiched between the spring receiving plate 152f and the holder 152.

Figure 15:
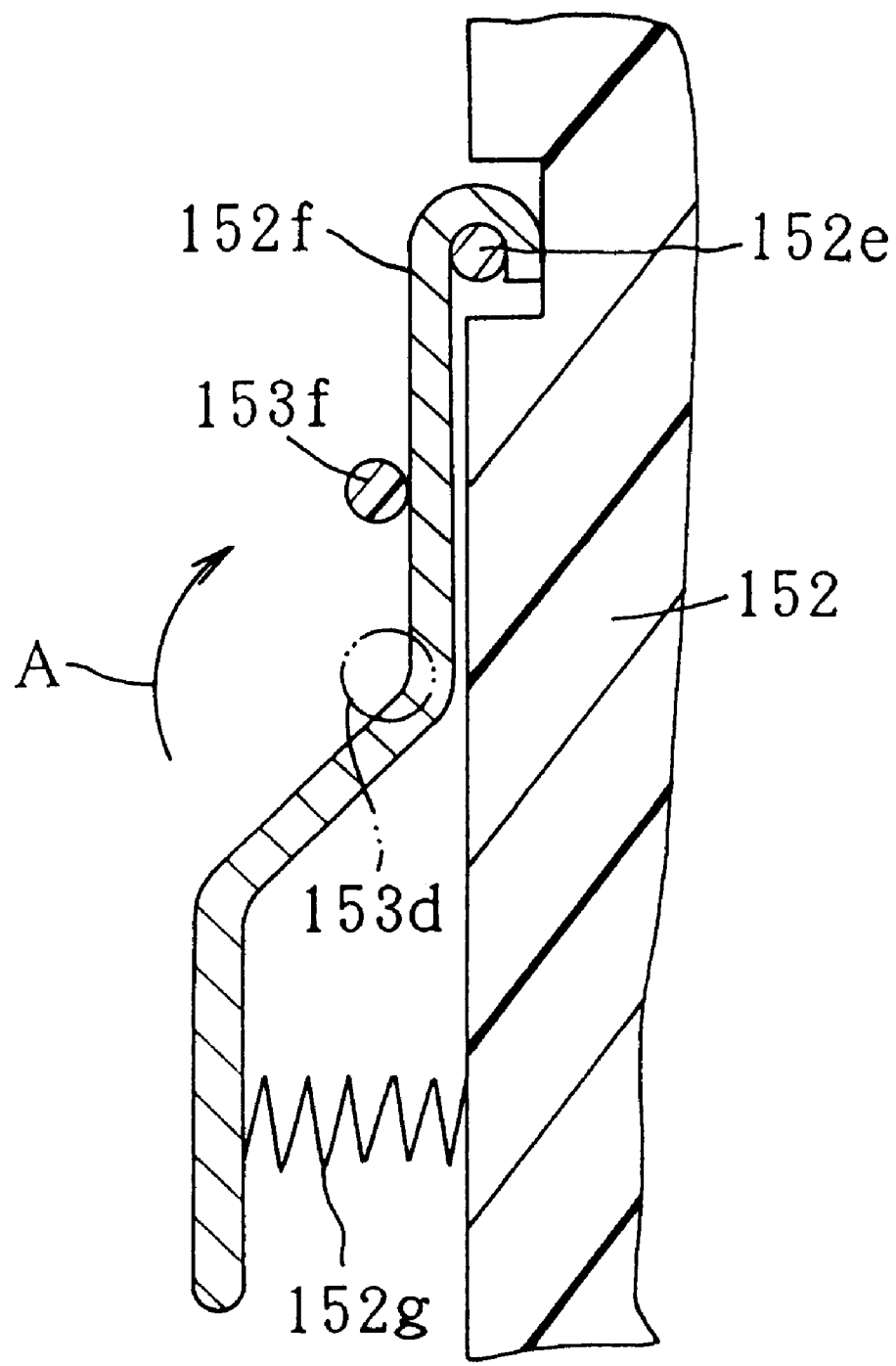
FIG. 15 is a partial sectional view of the head-mounted display device according to the second embodiment of the present invention.

The coupling shaft 153d passes rotatably through the supporting hole 152b, the swing restrictor 153e fits into the cavity 152c, and the pressing section 153f passes through the guide hole 152d. Thereby, each holder 152 is connected to the coupling section 153, swingably about the coupling shaft 153d running in a vertical direction. The swinging range of the holder 152 is restricted to a certain range by means of the swing restrictor 153e contacting the inner sides of the cavity 152c. As illustrated in FIG. 15, the pressing section 153f presses the holder 152 in front of the coupling shaft 153d, via the spring receiving plate 152f and the spring 152g. An elastic force acts on the holder 152 by means of this pressing action, causing the front side of the holder 152 to swing towards the side of the observer's 102 head as shown by arrow A. Therefore, the force exerted by the side head pads 151 on the region surrounding the ears is greater in front of the ears than behind the ears. A retaining ring (omitted from diagram) is attached to the end of the coupling shaft 153d, thereby preventing the holder 152 from becoming detached from the coupling section 153.

For example, the pressure exerted via each side head pad 151 on the side of the head is set to a total of 400 to 800 gf, of which approximately ½ to ¾ is accounted for by pressure applied to the head region in front of the ear, and the remaining pressure is applied to the regions above, below and behind the ear.

As shown in FIG. 12, the aforementioned left and right upper head pads 154 are attached respectively to pad receivers 156. These pad receivers 156 are attached respectively to the coupling section 153 via plate springs 157. The left and right upper head pads 154 are pressed against the left and right upper portions of the head, due to the elastic force of the plate springs 157.

The aforementioned rear head belt 155 is made from an elastic material, such as rubber, or the like, which imparts an elastic force narrowing the interval between the left and right holders 152, in the rear of the observer's 102 ears. As shown in FIG. 14, a slit 152h is formed in the rear of each holder 152. One end of the rear head belt 155 is inserted into the slit 152h in one of the holders 152, and the other end thereof is inserted into the slit 152h in the other holder 152. Each end of the rear head belt 155 is coupled to the holder 152 by means of a hinge shaft 158, such that it can swing in a vertical direction. Thereby, the position of the rear head belt 155 can be adjusted vertically according to the shape of the observer's head. This rear belt 155 also has the function of preventing the head-mounted display device from falling off when the observer 102 bends forward.

As illustrated in FIGS. 12 and 13, a receiver 152i is formed on each of the holders 152. On one side of the observer's 102 head, the aforementioned coupling mechanism 170 is connected detachably to one of the receivers 152i on one of the left and right holders 152 via the receiving member 172, in such a manner that its position can be adjusted in the front/back direction.

In the present embodiment, the drive signal generating device is attachable to, and detachable from, the holding member on either side of the head, thereby allowing the image to be seen with either the left eye or right eye. In other words, the display unit 104 can be connected to the holding member 103 on the other side of the observer's 102 head via the receiver 152i on the other of the left and right-hand holders 152. In this case, the display device 111 is inverted, so that the coupling position of the casing 124 with the coupling member 112 is inverted, and the display image is also inverted. By this means, the observer 102 can see the image with his or her either eye.

Figure 16:
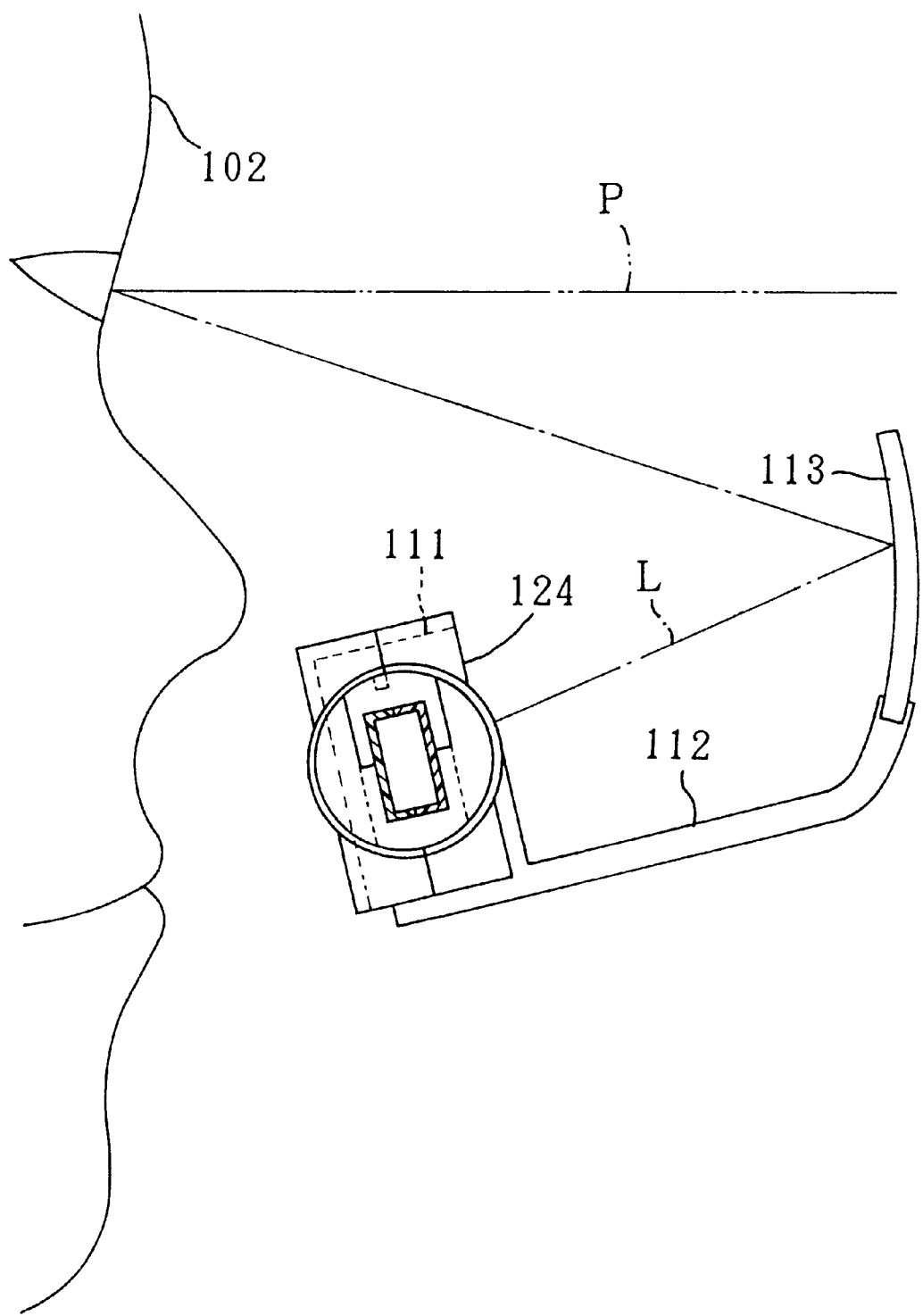
FIG. 16 is a diagram illustrating the action of the head-mounted display device according to the second embodiment of the present invention.

As shown in FIG. 16, in a state where the aforementioned head-mounted display device 101 is being worn by an observer 101, the aforementioned display device 111 is positioned in front of the observer's 102 face, and opposes the observer's 102 face with an interval. The display device 111 emits display light L in a forward direction from a position separated radially from the visual axis P of the observer 102 looking straight ahead. Therefore, the display device 111 is located between the left and right-hand sides of the observer's 102 head, in a position directly below the visual axis P. The aforementioned optical system 113 is located in front of the display device 111 with an interval, and furthermore, it is located directly below the visual axis P. By this means, the optical system 113 changes the light path of the image display light L in a position that is separated radially from the visual axis P between the left and right-hand sides of the observer's 102 head. The display device 111 and optical system 113 are positioned as close as possible to the observer's 102 face. The aforementioned drive signal generating device 114 is located in a position separated radially from the visual axis P and separated with an interval from behind the display device 111 and optical system 113, in other words, beside the side of the observer's 102 head. The image display light L emitted from the display device 111 travels in a forward direction and the light path thereof is then changed by the optical system 113, thereby directing the light towards eye of the observer 102. In this way, the observer 102 sees an image. In the present embodiment, the plane containing the central axis of the light path of the image display light L and the aforementioned visual axis P lies in a vertical plane.

According to the constitution of the second embodiment, it is possible to obtain advantages similar to those afforded by the first embodiment. Furthermore, it is possible to move the display device 111 in a spherical plane in front of the observer's 102 face. By this movement, it is possible to rotate the display device 111 and optical system 113 about axes running in the vertical direction and lateral direction of the observer's 102 head, at the least. Thereby, it is possible to adjust the direction of travel of the image display light whose light path is changed by the optical system 113. Therefore, although there is wide variation between the shapes of the observers' 102 heads, an image can be formed in a position suitable for viewing by the observer. Since the display device 111 is movable in front of the observer's 102 face, fine adjustment of the position of the image can be carried out readily. Moreover, the housing 115 can be moved in a spherical plane with respect to the holding member 103 in a position beside the side of the observer's head 102, whereupon the display device 111 can be moved in a spherical plane with respect to the housing 115 in front of the observer's 102 face. Thereby, fine adjustment of the position of the image can be carried out swiftly.

Moreover, according to the constitution of the second embodiment, the movement of the holding member 103 with respect to the observer's head is restricted by means of the pressure applied to the sides of the observer's 102 head via the right and left side head pads 151. Accordingly, it is possible to prevent occurrence of shaking of the display device 111 and the optical system 113, thereby preventing any decline in viewing characteristics. Since the left and right-hand side head pads 151 press against the regions of the observer's head surrounding the ears, the position restricting the movement of the holding member 103 with respect to the observer's head covers a broader range than when the pads press against the observer's ears. Since an opening 200 is formed in the center of each side head pad 151 and the center of each holder 152, thereby exposing the observer's 102 ears, the observer's 102 hearing is not restricted. By forming each side head pad 151 and holder 152 into a continuous ring shape, as in the foregoing embodiment, pressure is applied to the whole region of the head surrounding the ear, in comparison with cases where the aforementioned elements are in the shape of the letter C. Therefore, it is possible to limit the movement of the holding member 103 with respect to the head more securely.

The display device 111 is located in front of the position where the display unit 104 and holding member 103 are coupled, and the optical system 113 is positioned in front of the display device 111. In this case, by making the pressing force exerted via the side head pads 151 greater in front of the ears than behind the ears, it is possible to restrict shaking of the image more reliably. Furthermore, it is possible to make the pressing force exerted via the side head pads 151 greater in front of the ears than behind the ears by the action of elastic force. Hence, by swinging movement of the holders 152 with respect to the coupling section 153, the side head pads 151 can be made to follow the shape of the observer's head, and shaking of the image can be limited reliably, even if there are individual differences in head shape. In this case, the rear head belt 155 imparts an elastic force narrowing the interval between the left and right holders 152 in the region behind the observer's ears 102. Consequently, it is possible to prevent the side head pads 151 from moving away from the observer's head in the region behind the ears, thereby preventing shaking of the image. Moreover, by pressing the left and right upper head pads 154 against the left and right upper portions of the observer's head, it is possible to restrict movement of the holding member 103 with respect to the head more securely. At least one of the thickness of the head side pads 151 and the thickness of the holders 152 is set such that the pressure surface 151a of each side head pad 151 follows the shape of the side of the observer's 102 head. By this means also, it is possible to restrict movement of the holding member 103 with respect to the head more securely.

The present invention is not limited to the foregoing embodiments. For example, it is also possible to position the drive signal generating device above the visual axis of the observer when looking straight ahead. Moreover, it is also possible for the back light used in the display device to be constituted by an LED, electric bulb, or the like, which does not require a lighting circuit, instead of a cathode tube which requires a lighting circuit. For the display device, it is also possible to use a self-illuminating type of display, such as a fluorescent display tube, or the like, which does not require a back light. Furthermore, in the second embodiment described above, the outer faces of the guide sections press against receiving faces due to the elasticity of the connecting plates themselves. In place of this, it is also possible to provide an elastic member, such as a spring, separately, in order to create an elastic force to impart the aforementioned pressure. Moreover, in the second embodiment, it is also possible to insert earphones into the observer's ears via the openings in the side head pads and holders, in cases where sound information is supplied to the observer.

What is claimed is:

1. A head-mounted display device comprising:
 a display device for emitting image display light, an optical system for changing the light path of the display light in order to direct the light towards an eye of an observer enabling the observer to see an image formed by the image display light with only one eye, and a drive signal generating device for the display device, are worn on a head of the observer,
 wherein the display device is located in such a manner that the display light is emitted in a forward direction from a position separated radially from the visual axis of the observer when looking straight ahead;

the optical system is located in front of the display device with an interval; and the drive signal generating device is located in a position that is separated radially from the visual axis and separated with an interval from the display device optical system, wherein the drive signal generating device is located behind said display device with an interval, beside a side of the head of the observer.

2. The head-mounted display device according to claim 1, wherein the display device is located directly below said visual axis.

3. The head-mounted display device according to claim 2, wherein the optical system is coupled to said display wherein the display device is located in such a manner that the light path of the display light is changed directly below said visual axis.

4. The head-mounted display device according to claim 1, wherein said display light is directed towards one eye of the observer;

a housing for covering said drive signal generating device is coupled to a holding member beside the side of the head of the observer;

said optical system is connected to said display device in such a manner that it is located in a position separated radially from said visual axis; and said display device is movably in a spherical plane relative to the housing covering said drive signal generating device, in front of the face of the observer.

5. The head-mounted display device according to claim 4, wherein the housing covering said drive signal generating device is coupled movably in a spherical plane to said holding member, beside the side of the head of the observer.

6. The head-mounted display device according to claim 1, further comprising a holding member having left and right side head pads which press against left and right sides of the head of the observer in regions surrounding the ears, and left and right holders for holding the pads, openings being formed in a center of the pads and the center of the holders, in such a manner that the ears of the observer are exposed.

7. The head-mounted display device according to claim 6, wherein the pads and the holders have a continuous ring shape.

8. The head-mounted display device according to claim 6, wherein the pressing force exerted via the pads on the left and right sides of the head in the regions surrounding the ears is greater in front of the ears than behind the ears.

9. The head-mounted display device according to claim 8, comprising means for imparting an elastic force which narrows the interval between the left and right holders behind the ears of the observer.

10. A head-mounted display device comprising:

a display device for emitting image display light, an optical system for changing the light path of the display light in order to direct the light towards an eye of an observer enabling the observer to see an image formed by the image display light with only one eye, and a drive signal generating device for the display device, are worn on a head of the observer, wherein the display device is located in such a manner that the display light is emitted in a forward direction relative to the head of the observer from a position separated radially from the visual axis of the observer when looking straight ahead;

the optical system is located in front of the display device in the forward direction with an interval;

the drive signal generating device is located in a position that is separated radially from the visual axis and separated with an interval from the display device and optical system; and a holding member having left and right side head pads which press against left and right sides of the head of the observer in regions surrounding the ears, and left and right holders for holding the pads, openings being formed in a center of the pads and the center of the holders, in such a manner that the ears of the observer are exposed, wherein the pressing force exerted via the pads on the left and right sides of the head in the regions surrounding the ears is greater in front of the ears than behind the ears and wherein the holding member comprises a coupling section for coupling the left and right holders;

the holders are each coupled to the coupling section, swingably about an axis in the vertical direction; and pressing sections are pressing against the holders via elastic members are provided on said coupling section, in such a manner than an elastic force is imparted causing the front side of each holder to swing towards the side of the head of the observer.

11. The head-mounted display device according to claim 10, wherein left and right upper head pads pressed against the left and right upper portions of the head of the observer are coupled to the coupling section.

\* \* \* \* \*